(12) United States Patent
Garcia et al.

(10) Patent No.: US 9,448,062 B2
(45) Date of Patent: Sep. 20, 2016

(54) APPARATUS AND METHOD FOR DETERMINING REFERENCE ELEMENTS OF AN ENVIRONMENT

(75) Inventors: Olivier Garcia, Paris (FR); Thomas Duval, Paris (FR); Raul Bravo, Paris (FR)

(73) Assignee: Balyo S. A., Paris (FR)

( * ) Notice: Subject to any disclaimer, the term of this patent is extended or adjusted under 35 U.S.C. 154(b) by 0 days.

(21) Appl. No.: 14/391,961

(22) PCT Filed: Apr. 11, 2012

(86) PCT No.: PCT/IB2012/001454
§ 371 (c)(1),
(2), (4) Date: Oct. 10, 2014

(87) PCT Pub. No.: WO2013/153415
PCT Pub. Date: Oct. 17, 2013

(65) Prior Publication Data
US 2015/0062595 A1  Mar. 5, 2015

(51) Int. Cl.
| *G01B 11/14* | (2006.01) |
| *G01B 11/02* | (2006.01) |
| *G01S 17/42* | (2006.01) |
| *G01S 7/48* | (2006.01) |
| *G05D 1/02* | (2006.01) |

(52) U.S. Cl.
CPC ............ *G01B 11/02* (2013.01); *G01B 11/026* (2013.01); *G01S 7/4808* (2013.01); *G01S 17/42* (2013.01); *G05D 1/024* (2013.01); *G05D 1/0274* (2013.01)

(58) Field of Classification Search
USPC .................................................. 356/614–640
See application file for complete search history.

(56) References Cited

U.S. PATENT DOCUMENTS

2011/0010033 A1   1/2011   Asahara et al.

FOREIGN PATENT DOCUMENTS

WO   WO 2007/051972 A1   5/2007

OTHER PUBLICATIONS

International Search report and Written Opinion related International Application PCT/IB2012/001454; report dated on Dec. 19, 2012.

(Continued)

*Primary Examiner* — Tri T Ton
(74) *Attorney, Agent, or Firm* — Miller, Matthias & Hull LLP (57) ABSTRACT

A method for determining reference elements of an environment, the method comprising at least the steps of: providing a ceiling value and a floor value; measuring, using a distance-measuring sensor, a set of environment point positions, each position comprising at least a first coordinate along a first direction and a second coordinate along a second direction non collinear with the first direction; determining reference elements of the environment comprising position of the set of environment point positions whose second coordinate is strictly smaller than the ceiling value and strictly higher than the floor value, and whose distance to the distance-measuring sensor, taken along the first direction, is a highest distance in a set of distances of environment points to the distance-measuring sensor, said distances being taken along the first direction.

13 Claims, 4 Drawing Sheets

(56) References Cited

OTHER PUBLICATIONS

Seo-Yeon Hwang et al: "Monocular Vision-Based SLAM in Indoor Environment Using Corner, Lamp, and Door Features From Upward-Looking Camera", IEEE Transactions on Industrial Electronics, IEEE Service Center, Piscatway, NJ, USA, vol. 52, No. 10, Oct. 1, 2011, pp. 4804-4812, XP011382428, ISSN: 0278-0046, DOI: 10.1109/TIE.2011.2109333 the whole document.

Gregor Michalicek et al: "A 3D simultaneous localization and mapping exploration system", Robotics and Biomimetics (ROBIO), 2011 IEEE International Conference on, IEEE, Dec. 7, 2011, pp. 1059-1065, XP032165926, DOI: 10.1109/ROBIO.2011.6181428 ISBN: 978-1-4577-2136-6 the whole document.

APPARATUS AND METHOD FOR DETERMINING REFERENCE ELEMENTS OF AN ENVIRONMENT

CROSS-REFERENCE TO RELATED APPLICATION

This application is a 35 USC §371 U.S. national stage filing of International Patent Applicatin No. PCT/IB2012/001454 filed on Apr. 11, 2012.

FIELD OF THE DISCLOSURE

The instant invention relates to a method and an apparatus for determining reference elements of an environment using a distance-measuring sensor.

BACKGROUND OF THE DISCLOSURE

Mobile robots, and especially autonomous or semi-autonomous mobile robots, frequently have to cope with the problem of localizing themselves in a new or changing environment for which a predetermined map is not available. To overcome this difficulty, simultaneous localization and mapping (SLAM) algorithms have been developed and can be used to build a map of the surroundings of a robot in real time and to compute a localisation of the robot based on this map.

For instance, EP 2 058 720 describes a method for generating a three dimensional map using structured light emitted by a robot toward a ceiling.

However, this solution has a number of drawbacks.

In particular, the interaction of a semi-autonomous robot with a human operator often involves the use of a predetermined map of the environment, which the operator uses to guide the robot or to indicate a specific destination to the robot.

Unfortunately, this predetermined map often differs from the environment map generated by the robot in real-time. These differences can, for instance, arise from non-reference elements such as boxes, furniture, doors, or the like, which can be moved or can change their appearances over time and will thus prevent the robot from being able to associate the predetermined map with the environment map.

The instant invention has notably for object to improve this situation.

SUMMARY OF THE DISCLOSURE

To this aim, according to the invention, such a method comprises at least the steps of:
  providing a ceiling value and a floor value;
  measuring, using a distance-measuring sensor, a set of environment point positions, each of said positions comprising at least a first coordinate along a first direction and a second coordinate along a second direction non collinear with the first direction;
  determining reference elements of the environment comprising a set of reference environment point positions comprising at least one position from the set of environment point positions whose second coordinate is strictly smaller than the ceiling value and strictly higher than the floor value, and whose distance to the distance-measuring sensor, taken along the first direction, is a highest distances in a set of distances of environment points to the distance-measuring sensor, said distances being taken along the first direction.

This way, non-reference elements of the environment can be identified with a high probability.

This can, among other things, allow a robot to associate a predetermined map with a real-time environment map, improve the computation of a path from one point to another in a map, and operations in a changing environment.

In some embodiments, one might also use one or more of the following features:
  the first and the second directions are perpendicular, said second direction corresponding to a vertical direction of the environment,
  the step of determining comprises at least the operations of:
    defining a set of inside point positions comprising positions from the set of environment point positions whose second coordinate is strictly smaller than the ceiling value and strictly higher than the floor value;
    computing, for each point position in a set of point positions, a distance, taken along the first direction, separating said point from the distance-measuring sensor, to give a set of distances; and
    identifying a set of reference environment point positions corresponding to positions of the set of inside point positions whose distance is a highest distance in the set of distances.
  the step of determining is reiterated for a plurality of first directions,
  the distance-measuring sensor comprises a laser,
  the first coordinates of a set of point positions are binned with a first bin interval,
  the second coordinates of a set of point positions are binned with a second bin interval.

According to another aspect of the invention, there is provided an apparatus for determining reference elements of an environment, the apparatus comprising:
  a distance-measuring sensor to measure a set of environment point positions, each of said positions comprising at least a first coordinate along a first direction and a second coordinate along a second direction non collinear with the first direction;
  a memory to store a provided ceiling value, a provided floor value and said set of environment point positions; and
  a processor to determine reference elements of the environment comprising a set of reference environment point positions corresponding to positions of the set of environment point positions whose second coordinate is strictly smaller than the ceiling value and strictly higher than the floor value, and whose distance to the distance-measuring sensor, taken along the first direction, is a highest distance in a set of distances of environment points to the distance-measuring sensor, said distances being taken along the first direction.

In some embodiments of the apparatus, one might also use one or more of the following features:
  the first and the second directions are perpendicular, said second direction corresponding to a vertical direction of the environment,
  the distance-measuring sensor comprises a laser.

According to yet another aspect of the invention there is provided a mobile robot comprising the above mentioned apparatus.

According to yet another aspect of the invention there is provided a non-transitory computer-readable storage device comprising instruction which, when they are executed on a processor of an apparatus, perform the above detailed method.

According to yet another aspect of the invention there is provided a computer program which, when it is executed on a processor of an apparatus, performs the above detailed method.

BRIEF DESCRIPTION OF THE DRAWINGS

Other characteristics and advantages of the invention will readily appear from the following description of one of its embodiments, provided as non-limitative examples, and of the accompanying drawings.

On the drawings.

On the different figures, the same reference signs designate like or similar elements.

DETAILED DESCRIPTION OF THE DISCLOSURE

Reference will now be made in detail to embodiments of the invention which are described below, by referring to the accompanying figures. In this regards, embodiments of the invention may be embodied in several different forms and should not be construed as being limited to embodiments set forth in the following.

Some embodiments of the invention, hereafter described with reference to flowcharts or block diagrams, will be understood as being implementable by computer readable instructions. These computer readable instructions can be provided to a processor of a general purpose computer, a special purpose processor or computer, or other programmable data processing circuit such that the instructions executed by the processor or circuit create modules that implement the operations and steps specified in the flowcharts blocks.

This way, embodiments of the present invention can be implemented through a non-transitory computer-readable storage device comprising any medium or media permitting the storing and transmission of the computer readable instructions or code.

The computer readable code can be recorded and transferred on a non-transitory computer-readable storage device in known ways and the device can include recording media, such as magnetic storage media and optical recording media. The storage device can include volatile and non-volatile memories. The storage device can also include elements of the Internet or of a computer network. Thus, the device may be a defined and measurable structure carrying or controlling a signal or information, such as a device carrying a bitstream, for example, according to embodiments of the present invention. The non-transitory computer-readable storage device may also be a distributed network, so that the computer program is stored, transferred and executed in a distributed fashion. By way of example only, the processor can include a circuit or a computer processor, and processing circuits may be distributed or be included in a single circuit.

An apparatus 1 for determining reference elements of an environment 2 will now be described with reference to FIG. 1.

Such an apparatus 1 can comprise a distance-measuring sensor 10, a processor or processing circuit 11 and a memory 12.

The distance-measuring sensor 10 can for instance include a laser rangefinder such as a light detection and ranging (LIDAR) module, a radar module, an ultrasonic ranging module, a sonar module, a ranging module using triangulation or any other device able to acquire the distance or the position of a single or a plurality of points of the environment.

In a preferred embodiment, a distance-measuring sensor 10 is employed which emits an emitted physical signal and receives a reflected physical signal. This distance-measuring sensor then computes a range, corresponding to a distance from the sensor to a single or a plurality of environment points, by comparing the emitted signal and the reflected signal, for instance by comparing the time of emission and the time of reception.

The emitted and reflected physical signals can be for instance light beams, electromagnetic waves or acoustic waves.

Advantageously, a laser rangefinder 10 is employed. This laser rangefinder 10 can scan the environment 2 of the apparatus 1 in a two-dimensional plane X, Y to acquire a set of observations $O_i$ corresponding to a set of points of the environment, the points being for instance indexed by a number i. Each observation $O_i$ can comprise a range $R_i$ and a bearing $\alpha_i$ associated with a point of the environment.

The range can correspond to a distance between the point of the environment and the distance-measuring sensor 10 and the bearing can correspond to an angle between the line joining the point of the environment to the distance-measuring sensor 10 and a direction comprised in the two-dimensional plane X, Y.

The two-dimensional plane X, Y can comprise a first direction X and a second direction Y not collinear with the first direction X, said directions forming coordinate axes.

The distance-measuring sensor 10 can for instance scan the environment 2 by rotating around a third direction Z. The third direction can be perpendicular to the first and the second directions, thus allowing the sensor 10 to scan the environment 2 in said two-dimensional plane X, Y and acquire observations corresponding to a set of points of the environment, said observations being for instance acquired with regularly spaced bearings.

In some embodiments, the distance-measuring sensor 10 can consist in a laser rotating around the third direction with a constant rotational speed and emitting light pulses at a constant time rate. Reflected light pulses are collected by the distance-measuring sensor 10 and the time difference between the emitted and the received pulses can give the range of the specific environment point.

The memory 12 is able to store a device position $P_A$ that can be estimated, for instance in real time, or be preliminarily defined. This position can correspond to the position of the apparatus 1 or the distance-measuring sensor 10. This position can further comprise a first coordinate $x_A$ along the first direction X and a second coordinate $y_A$ along the second direction Y.

The processor 11 can transform, using simple trigonometric formulas, each observation $O_i$ acquired by the laser range finder 10 into an environment point position $P_i$ comprising two coordinates, a first coordinate $x_i$ along the first direction X and a second coordinate $y_i$ along the second direction Y, said environment point position $P_i$ being stored in the memory 12.

The first X and second Y directions can correspond to any axe or direction of a coordinate system able to define the position of a point of the environment in at least two dimensions. They can correspond to directions or axes, such as axes of a polar, cylindrical, spherical coordinate system, or the like.

They can advantageously correspond respectively to a horizontal and a vertical direction of the environment 2. The third direction Z can then correspond to another horizontal direction, perpendicular to the first direction X.

In the later example, an environment point position $P_i=(x_i, y_i)$ can be simply computed from an associated observation $O_i=(R_i, \alpha_i)$ and the device position $P_A=(x_A, y_A)$ as $$P_i = \binom{x}{y} = \binom{x_A + R\cos(\alpha)}{y_A + R\sin(\alpha)} \quad (1)$$

Figure 1:
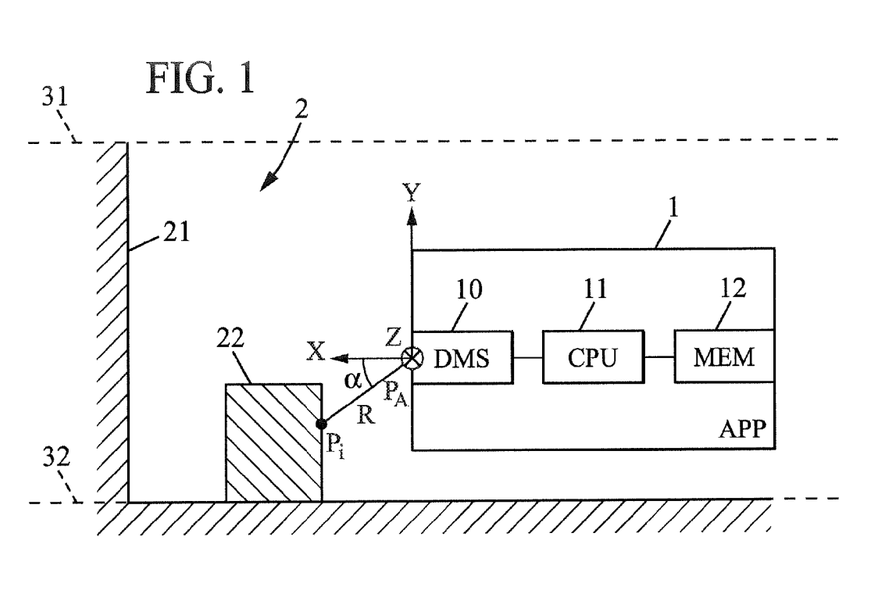
FIG. 1 is an illustration of an apparatus according to an embodiment of the invention.

An illustration of an environment 2 is illustrated on FIG. 1 comprising a wall 21 and a box 22. The wall 21 is a reference element of the environment 2 and the box 22 is a non-reference element of the environment 2. This illustration of an environment is given by the way of example only and it is understood that an environment can be of any type of environment that might be encountered by an apparatus according to the invention. In particular, an environment can include a variety of objects and elements corresponding to the variety of object that can be seen in natural and artificial environments.

Figure 3A:
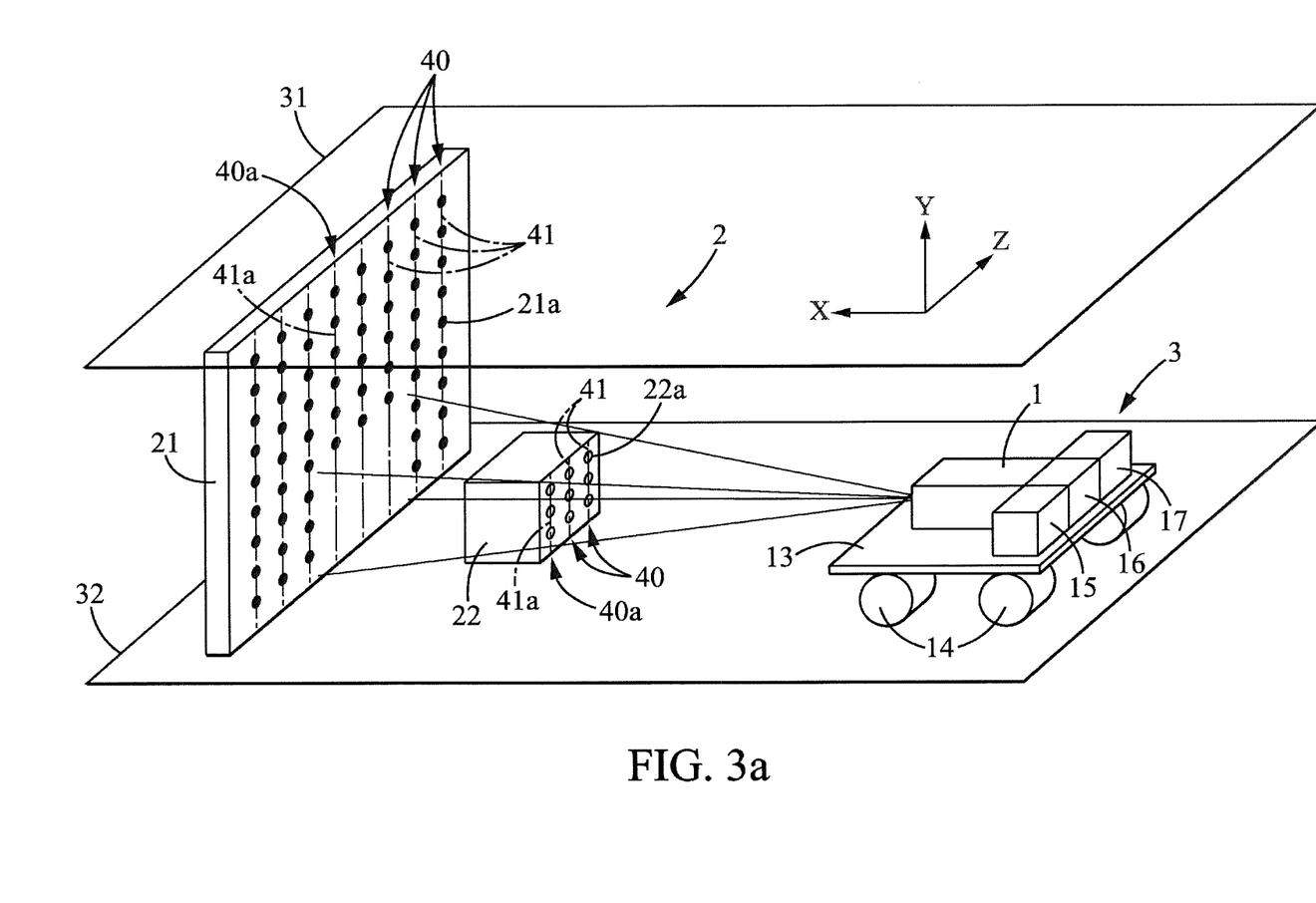
FIGS. 3a, 3b and 3c are illustrations of mobile robots according to embodiments of the invention in different environments.
Figure 3B:
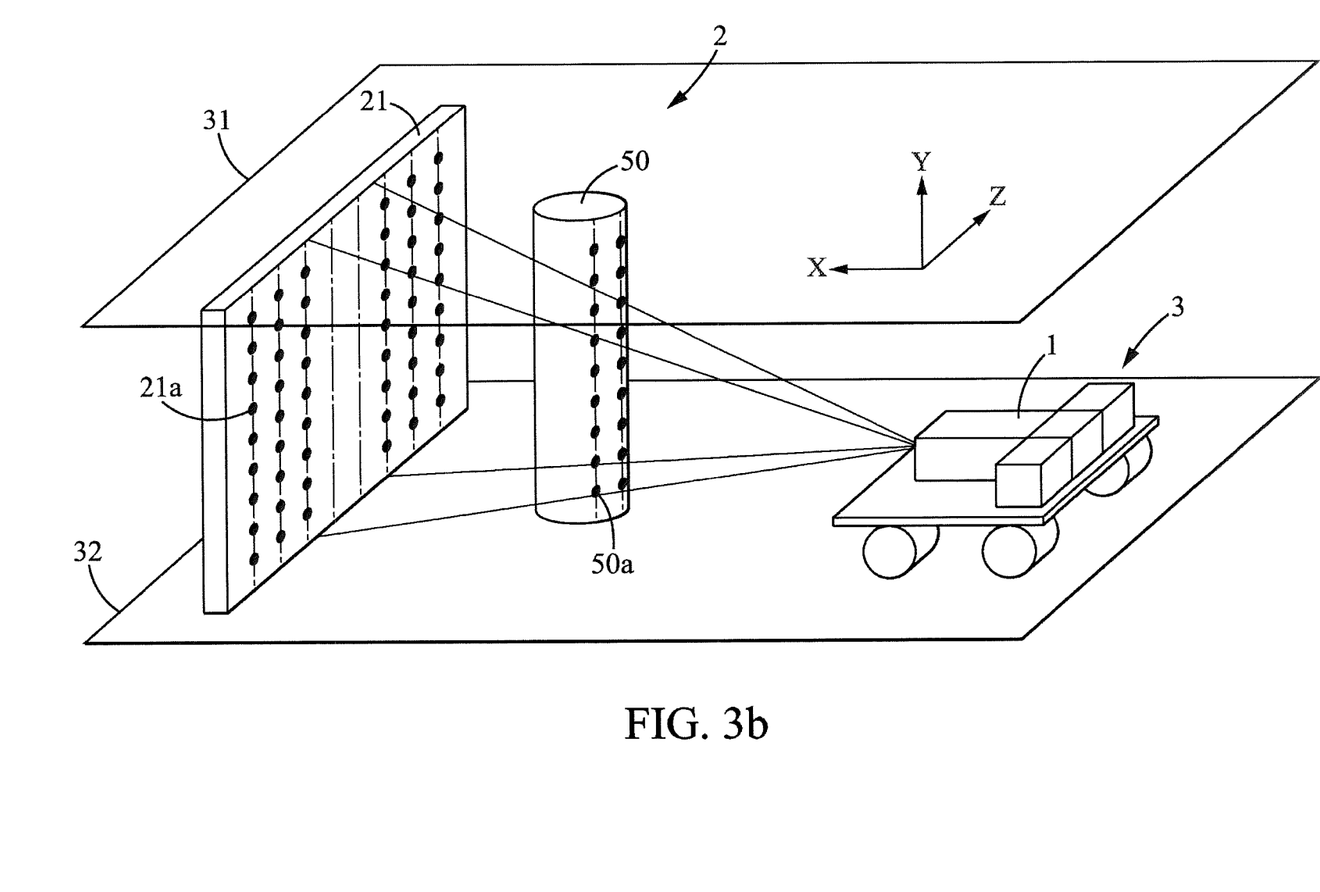
Figure 3C:
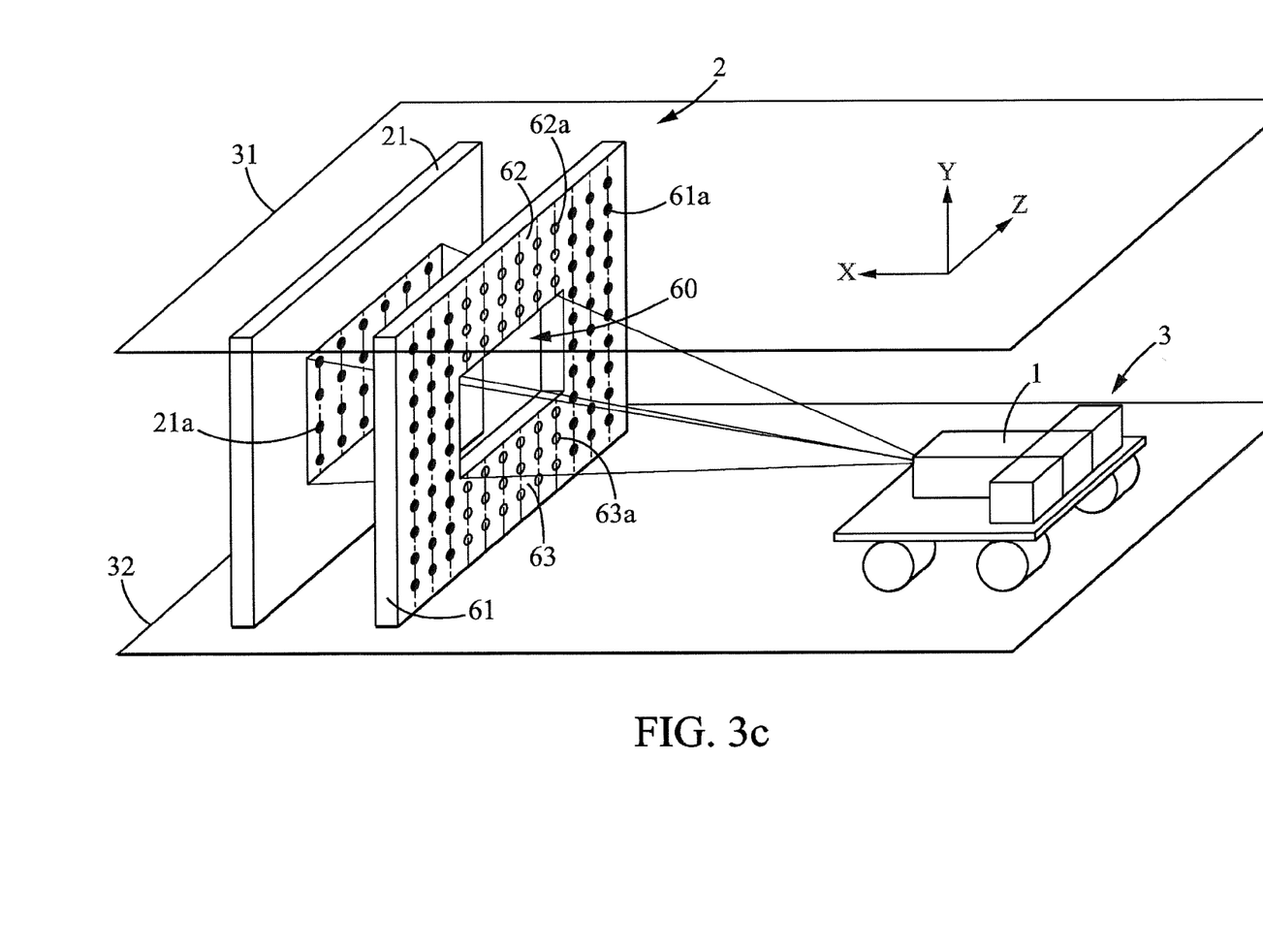

Further illustrations of environments 2 are given in FIGS. 3a, 3b and 3c together with embodiments of a robot 3 comprising an apparatus 1.

With reference to FIG. 3a, a robot 3 can comprise the above mentioned apparatus 1 as well as additional modules.

As illustrated on the embodiment of FIG. 3a, the robot 3 can include a frame 13 and a plurality of wheels or crawler tracks 14.

In some embodiments, the wheels or crawler tracks 14 can be adapted to be motorised and the robot 3 can thus move autonomously within the environment 2. The robot 3 can thus be a mobile robot 3.

The robot 3 can further comprise one or several motors 15 connected to the wheels or crawler tracks 14 as well as one or several batteries or power source 16 and communication modules 17, able to receive and/or send information with a user's external device by using a wired or wireless communication link.

With further reference to FIGS. 2, 3a, 3b and 3c, a method for determining reference elements in the environment 2 will now be described.

Figure 2:
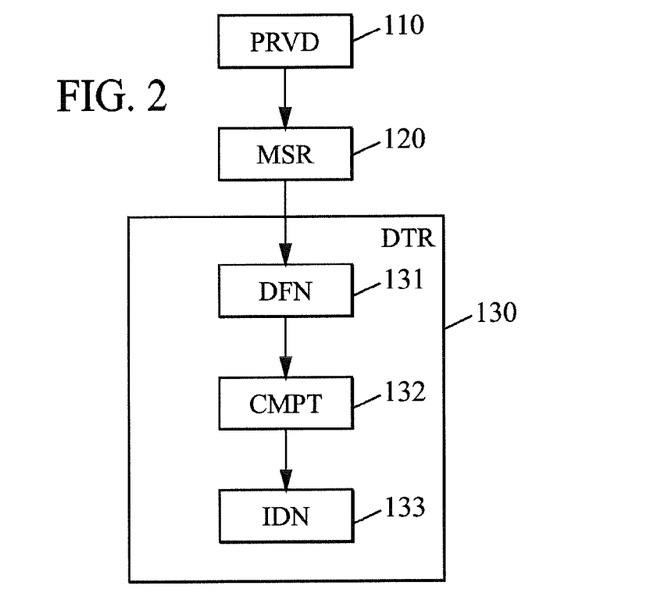
FIG. 2 is a flowchart illustrating a method according to an embodiment of the invention.

Such a method can comprise a first step 110 in which a ceiling value $y_C$ and a floor value $y_F$ are provided. These values can for instance be provided by an operator that can be a human operator.

These values can respectively corresponds to a virtual or real ceiling 31 and a virtual or real floor 32 in the environment 2 as illustrated on FIG. 1.

These values can be stored in the memory 12 of the apparatus.

These values might also be provided during subsequent steps 120, 130.

These values might also be determined by the apparatus 1 in real time or during subsequent steps.

In a second step 120, one or several sets 40 of environment point positions $P_i$ are measured using the aforementioned distance-measuring sensor 10, processor 11 and memory 12. The positions can be computed from a set of observations $O_i$ performed by the apparatus as detailed above with reference to FIG. 1. The operation of computing positions from observations can be performed by using simple trigonometric formulas such as formula (1).

As illustrated on FIG. 3a, a set 40 can comprise environment point positions $P_i$ aligned along a straight line 41.

The straight line 41 can, for instance, be comprised within the two-dimensional plane X, Y.

The straight line 41 can be further aligned with the second direction Y.

As illustrated on FIG. 3a, a set 40a can comprise environment point positions $P_i$ located on different elements of the environment 2.

The set 40a can comprise environment points aligned along straight lines 41a.

In particular, a set 40a can comprise environment point positions $P_i$ whose first coordinates $x_i$ are spaced apart from one another.

In some embodiments, the second coordinate $y_i$ of each environment point position $P_i$ may be limited in order to be comprised between the ceiling value $y_C$ and the floor value $y_F$. Thus, if a second coordinate $y_i$ of an environment point position $P_i$ is higher than the ceiling value $y_C$, this second coordinate $y_i$ may be replaced by the ceiling value $y_C$. In a similar way, if a second coordinate $y_i$ of an environment point position $P_i$ is lower than the floor value $y_F$, this second coordinate $y_i$ may be replaced by the floor value $y_F$.

In a third step 130, reference environment points and reference elements of the environment are determined. The step of determining 130 can comprise several operations.

In a first operation 131, a set of inside point positions is defined.

The set of inside point positions is composed of point positions of the set of environment point whose second coordinate $y_i$ is strictly smaller than the ceiling value $y_C$ and strictly higher than the floor value $y_F$.

The second coordinates of the point positions belonging to the set of inside point positions are thus strictly comprised between the ceiling value $y_C$ and the floor value $y_F$.

If a second coordinate $y_i$ of an environment point $P_i$ is equal to or higher than the ceiling value $y_C$, respectively equal to or lower than the floor value $y_F$, this environment point is assumed to be part of the ceiling, respectively of the floor, and is thus not taken in consideration for the determination of non-reference elements of the environment.

In a second operation 132 a set of distances is computed. For each inside point position $P_i=(x_i, y_i)$, a distance $D_i$, taken along the first direction X, separating said inside point from the apparatus 1 or the distance-measuring sensor 10, is computed.

Such distance can be, for instance, computed from the inside point position $P_i=(x_i, y_i)$ and the device position $P_A=(x_A, y_A)$ using a formula like $D_i=|x_i-x_A|$.

A distance, taken along a direction, between two points is a distance between two respective projections of said two points on said direction. Such a distance can thus be calculated from the coordinates of said two point positions.

In an embodiment of the invention wherein the first and the second directions correspond to axis of a polar, cylindrical, spherical coordinate system, the formula employed for the computation of the distance may be more elaborate and would be determined accordingly by a skilled man using known mathematical distance formulas.

In a variant, the distance might be computed in a plane, comprising two directions, for instance by using a formula such as $D_i=\sqrt{(x_i-x_A)^2+(z_i-z_A)^2}$ where $z_A$ is a third coordinate of the device position $P_A$ and $z_i$ is a third coordinate of the point position $P_i$.

In a variant, the second operation might be performed on the set of environment points instead of the set of inside points.

In a third operation 133, a set of reference environment point positions is identified.

This set of reference environment point positions corresponds to positions of the set of inside point positions, or the set of environment point positions, whose distance is a highest distance in the set of distances.

A set of non-reference environment point positions can also be identified, corresponding to positions of the set of inside point positions, or the set of environment point positions, whose distance is not the highest distance in the set of distances.

Most non-reference elements have an extension, taken along the second direction, which is strictly smaller than the distance separating the virtual ceiling from the virtual floor.

A non-reference element which has an extension, taken along the second direction, strictly smaller than the distance separating the virtual ceiling from the virtual floor will thus leave a finite open distance along the second direction Y free of obstacle.

This finite open distance can provide access to more distant elements of the environment, such as the wall 21, for the distance-measuring sensor 10.

By way of illustration only, such non-reference elements can comprise boxes, trolleys, pallets, stored products and the like.

An environment comprising a box 22 is for instance shown on FIG. 3a in which a box 22 is for instance located in front of a wall 21.

The extension of the box 22 along the vertical direction Y is strictly smaller than the distance separating the virtual ceiling 31 from the virtual floor 32.

The box 22 will thus be detected as a non-reference element as further explained below.

The extension of the wall 21 along the vertical direction Y is equal or higher than the distance separating the virtual ceiling 31 from the virtual floor 32.

The wall 21 will thus be detected as a reference element as further explained below.

Several sets of inside point positions 40 are illustrated on FIGS. 3a, 3b and 3c.

A set of inside point positions 40a, taken along a vertical line 41, can comprise environment points of the wall 21a and environment points of the box 22a.

Since the box 21 is located in front of the wall 21 and since its extension, taken along the second direction Y, is strictly smaller than the distance separating the virtual ceiling 31 from the virtual floor 32, some environment points of the wall 21a comprised in the set of inside point positions 40a are located farther from the apparatus 1 than some environment points of the box 22a comprised in the set of inside point positions 40a.

Consequently, the distance $D_i$, taken along the first direction X, separating said environment points of the wall 21a from the apparatus 1, or from the distance-measuring sensor 10, is higher than the distance $D_i$ separating said environment points of the box 22a from the apparatus 1, or from the distance-measuring sensor 10.

Since a set of reference environment point positions corresponds to positions of the set of inside point positions, or the set of environment point positions, whose distance is a highest distance in the set of distances, the wall 21 is identified as a reference element.

Similarly, environment points of the box 22a whose distances are not highest distances among the set of distances, are identified as non-reference environment point positions.

Box 21 is thus identified as a non-reference element of the environment 2.

The present method thus provides a way to distinguish non-reference elements from reference elements with a high probability of success.

With reference to FIG. 3b, an example of successful identification of a column 50 as a reference element of an environment 2 is illustrated.

Column 50 is located in front of a wall 21 in the example of FIG. 3b but it should be noted that said wall 21 is not required for the identification of column 50 as long as the extension of column 50, taken along the second direction, is equal to, or larger than, the distance separating the virtual ceiling from the virtual floor.

FIG. 3c illustrates an environment 2 comprising an opening 60 in a first wall 61 located in front of a second wall 21 with respect to an apparatus 1.

The opening 60 separates two sets of environment point of the first wall 61 or two elements of the environment 2: a set of upper environment points 62a of the first wall, which belong to an upper first wall 62; and a set of lower environment points 63a of the first wall, which belong to a lower first wall 63.

Since the vertical extensions of these two set of environment point or two elements are strictly smaller than the distance separating the virtual ceiling 31 from the virtual floor 32, these elements are identified as non-reference elements of the environment 2.

The upper first wall 62 and lower first wall 63 of an opening 60 are thus identified as non-reference elements while they should be identified as reference elements.

It should be noted that a small number of false negative and/or false positive identifications is not detrimental to a fine association of a predetermined map with a real-time environment map and to the other advantages detailed further above.

The location of the virtual ceiling and the virtual floor can be adjusted by setting values for the ceiling value $y_C$ and the floor value $y_F$ that are adjusted to the environment of the embodiment of the invention.

The ceiling value $y_C$ and the floor value $y_F$ respectively define the location of the virtual ceiling and the virtual floor along the second direction.

In some embodiments of the invention, the first coordinate of the set of environment positions, can be binned or quantized with a first bin interval.

Thus, first coordinates that fall within an interval whose width is equal to the first bin interval are replaced by a value representative of that interval. This value can be the central value of the interval or an arbitrary index indicating the interval.

This way, deviations of some alignments of environment points from the first direction can be compensated for. These deviations can arise for instance from uncertainties in the measurements or tilts of elements in the environment.

The second coordinate of the set of environment positions, can also be binned or quantized with a second bin interval.

This way, deviations of some alignments of environment points from the second direction can be compensated for.

These deviations can arise for instance from uncertainties in the measurements or tilts of elements in the environment.

In another embodiment, the positions can comprise a third coordinate along a third direction, non-collinear with the first and the second directions.

It is to be noted that the specific order of the operations set forth above might be changed without departing from the invention.

Some of the above operations might also be combined in single operations.

The order of the above described steps might also be exchanged in some embodiments without departing from the invention.

In particular the first step 110 of providing a ceiling value $y_C$ and a floor value $y_F$ might be performed during and after the second step 120 of measuring or during or after the third step 130 of determining.

The first step 110 might be reiterated several times in order to adapt the ceiling value $y_C$ and the floor value $y_F$ to the measured environment point positions.

It might be reiterated during and after the second step 120 of measuring or during or after the third step 130 of determining.

The above described steps might be combined together in fewer steps.

Various operations of the third step 130 of determining might be performed during the second step 120 of measuring.

For instance, the first operation of the third step 131, comprising the definition of a set of inside point positions, can be performed directly during the second step 120 of measuring.

The computation of the set of distances, performed in the second operation of the third step 132, might also be performed during the second step 120.

While various aspects of the invention have been described with particular details and with reference to specific embodiments, it should be understood that these embodiments are to not be considered as restricting the scope of the present invention.

The invention claimed is:

1. A method for determining reference elements of an environment, the method comprising at least the steps of:
   providing, to a memory, a ceiling value corresponding to a virtual of real ceiling in the environment, and a floor value corresponding to a virtual of real floor in the environment;
   measuring, using a distance-measuring sensor, a set of environment point positions, each of said positions comprising at least a first coordinate along a first direction and a second coordinate along a second direction non collinear with the first direction;
   determining, using a processor, reference elements of the environment comprising a set of reference environment point positions, said set comprising at least one position from the set of environment point positions
   whose second coordinate is strictly smaller than the ceiling value and strictly greater than the floor value, and
   whose distance to the distance-measuring sensor, taken along the first direction, is a highest distance in a set of distances of distances of environment points to the distance-measuring sensor, said distances being take along the first direction.

2. The method of claim 1, wherein the first and the second directions are perpendicular, said second direction corresponding to a vertical direction of the environment.

3. The method of claim 1, wherein the step of determining comprises at least the operations of:
   defining a set of inside point positions comprising positions from the set of environment point positions whose second coordinate is strictly smaller than the ceiling value and strictly higher than the floor value,
   computing, for each point position in a set of point positions, a distance, taken along the first direction, separating said point from the distance-measuring sensor, to give a set of distances;
   identifying a set of reference environment point positions corresponding to positions of the set of inside point positions whose distance is a highest distance in the set of distances.

4. The method of claim 1, wherein the step of determining is reiterated for a plurality of first directions.

5. The method of claim 1, wherein the distance-measuring sensor comprises a laser.

6. The method of claim 1, wherein the first coordinates of a set of point positions are binned with a first bin interval.

7. The method of claim 1, wherein the second coordinates of a set of point positions are binned with a second bin interval.

8. An apparatus for determining reference elements of an environment, the apparatus comprising:
   a distance-measuring sensor to measure a set of environment point positions, each of said positions comprising at least a first coordinate along a second direction non collinear with the first direction;
   a memory to store a provided ceiling value corresponding to a virtual or real ceiling in the environment, a provided floor value corresponding to a virtual or real floor in the environment, and said set of environment point positions
   a processor to determine reference elements of the environment comprising a set of reference environment point positions corresponding to positions of the set of environment point positions
   whose second coordinate is strictly smaller than the ceiling value and strictly greater than the floor value, and
   whose distance to the distance-measuring sensor, taken along the first direction, is a highest distance is a set of distances of environment points to the distance-measuring sensor, said distances being taken along the first direction.

9. The apparatus of claim 8, wherein the first and the second directions are perpendicular, said second direction corresponding to a vertical direction of the environment.

10. The apparatus of claim 8, wherein the distance-measuring sensor comprises a laser.

11. A mobile robot comprising the apparatus of claim 8.

12. A non-transitory computer-readable storage device comprising instruction which, when they are executed on a processor of an apparatus, perform the method of claim 1.

13. A computer program stored on a non-transitory computer-readable storage device which, when it is executed on a processor of an apparatus, performs the method of claim 1.

* * * * *